United States Patent [19]
Guida

[11] Patent Number: 6,102,215
[45] Date of Patent: Aug. 15, 2000

[54] HOLDING DEVICE FOR CAULKING CANISTERS AND A CAULKING GUN

[76] Inventor: Louis V. Guida, 15 Perry Ave., Spotswood, N.J. 08884

[21] Appl. No.: 09/307,069

[22] Filed: May 7, 1999

[51] Int. Cl.[7] ..................................................... A47F 5/00
[52] U.S. Cl. .................... 211/70.6; 211/60.1; 211/71.01; 211/75; 211/87.01; 248/311.2; 206/384
[58] Field of Search .................... 211/70.6, 60.1, 211/75, 87.01, 71.01; 248/311.2, 314; 206/372, 384

[56] References Cited

U.S. PATENT DOCUMENTS

| | | | |
|---|---|---|---|
| 1,917,603 | 7/1933 | Schultz | 211/70.6 |
| 2,102,977 | 12/1937 | Shoemaker et al. | 211/70.6 |
| 3,032,891 | 3/1962 | Sutter . | |
| 3,552,612 | 1/1971 | Greis . | |
| 4,305,512 | 12/1981 | Mackenzie . | |
| 4,450,961 | 5/1984 | Bies . | |
| 4,830,247 | 5/1989 | Banks | 211/70.6 X |
| 4,976,450 | 12/1990 | Ellefson . | |
| 5,002,293 | 3/1991 | Gottselig . | |
| 5,080,240 | 1/1992 | Williams | 211/70.6 |
| 5,337,907 | 8/1994 | McKenzie et al. | 211/75 X |
| 5,429,430 | 7/1995 | Johnson . | |
| 5,567,029 | 10/1996 | Haenisch et al. | 211/75 X |
| 5,695,104 | 12/1997 | Darling . | |
| 5,911,330 | 6/1999 | Chiles | 211/71.01 |

*Primary Examiner*—Robert W Gibson, Jr.
*Attorney, Agent, or Firm*—Ezra Sutton

[57] ABSTRACT

A holding device for mounting and holding a plurality of caulking canisters and a caulking gun thereon. The holding device includes a back board for vertical mounting having a plurality of holes for mounting the back board to a vertical surface, the back board having an upper section, a center section and a lower section. The holding device further includes a shelf having a plurality of recessed seats for receiving the bottom ends of the caulking canisters, the shelf being connected to the center section of the back board. The holding device also includes a plurality of support rings in alignment with the plurality of recessed seats for receiving the upper end of the caulking canisters, the plurality of support rings being connected to the upper section of the back board. Two mounting brackets are provided for receiving and mounting a caulking gun thereon, the two mounting brackets being connected to the lower section of the back board.

11 Claims, 4 Drawing Sheets

HOLDING DEVICE FOR CAULKING CANISTERS AND A CAULKING GUN

FIELD OF THE INVENTION

This invention relates to a holding device for mounting and holding a plurality of caulking canisters and a caulking gun. More particularly, the holding device can be mounted on a vertical surface in a garage, a basement or a home workshop, or on the back door of a van.

BACKGROUND OF THE INVENTION

The organizing of workman's and homeowner's tools and their supplies are a constant problem to the user. Often these tools and supplies are either lost, misplaced, or buried under other tools or supplies whether in the home shop, workplace or in a commercial van or truck. This situation is especially troublesome to plumbers, carpenters, electricians and all other tradesmen working out of their commercial van or truck or shop as the tradesmen is constantly purchasing additional supplies or tools which he already has, or were damaged during their misstorage.

There remains a need for a holding device for mounting and holding a plurality of caulking canisters and a caulking gun, such that this holding device can easily be mounted on a vertical surface in a garage, a basement, or a home workshop or on the back door of a van or service truck in order to prevent damage to the caulking canisters and caulking gun, as well as preventing misplacement or losing of these items.

DESCRIPTION OF THE PRIOR ART

Holding devices, tool chests, display cabinets, service carts, display brackets and rack structures having various designs, configurations, structures and materials of construction have been disclosed in the prior art. For example, U.S. Pat. No. 4,976,450 to ELLEFSON discloses a mechanic's mobile tool chest with a plurality of drawers and trays for holding power tools and spray cans. The tool chest also includes a tool rack designed to hold screw drivers and nut drivers. This patent does not disclose the basic structure of the present invention.

U.S. Pat. No. 4,450,961 to BIES discloses a display bracket comprising a support wall and rear wall for holding a tool. This assembly is adapted so that it can be hung on a peg board for point-of-sale display. This support assembly for a tool does not disclose the particular design or configuration of the present invention for a holding device having a rack and shelf for a caulking gun and canisters, respectively.

U.S. Pat. No. 5,429,430 discloses a display apparatus or cabinet which holds items in individual bins such as trading cards, for purchase at a separate location in the store. The items are displayed behind transparent rails. The display cabinet of this prior art patent does not disclose the particular design, structure or configuration of the present invention of a holding device with a rack support beneath the shelf.

None of prior art patents disclose or teach a holding device that provides for mounting and holding multiple caulking canisters and a caulking gun on a support shelf and mounting rack, respectively.

Accordingly, it is an object of the present invention to provide a holding device for mounting and holding multiple caulking canisters and a caulking gun on a support shelf and mounting rack, respectively.

Another object of the present invention is to provide a holding device that includes a shelf member having a plurality of recessed seat cavities for receiving the bottom ends of the caulking canisters.

Another object of the present invention is to provide a holding device that includes a plurality of support rings in alignment with the plurality of recessed seat cavities for receiving the upper ends of the caulking canisters.

Another object of the present invention is to provide a holding device that includes a pair of mounting brackets for receiving and mounting a caulking gun thereon.

Another object of the present invention is to provide a holding device that can be attached to a vertical surface in a work shop, a home basement, a garage, or on a back door of a van or a commercial truck.

Another object of the present invention is to provide a holding device that is durable, non-breakable, light-weight and easy to install.

A further object of the present invention is to provide a holding device that can be mass produced in an automated and economical manner and is readily affordable by the user.

SUMMARY OF THE INVENTION

In accordance with the present invention, there is provided a holding device for mounting and holding a plurality of caulking canisters and a caulking gun thereon. The holding device includes a back board for vertical mounting having a plurality of holes for mounting the back board to a vertical surface, the back board having an upper section, a center section and a lower section. The holding device further includes a shelf having a plurality of recessed seats for receiving the bottom ends of the caulking canisters, the shelf being connected to the center section of the back board. The holding device also includes a plurality of support rings in alignment with the plurality of recessed seats for receiving the upper end of the caulking canisters, the plurality of support rings being connected to the upper section of the back board. Two mounting brackets are provided for receiving and mounting a caulking gun thereon, the two mounting brackets being connected to the lower section of the back board. The bracket on the right is 180° (U-strap) and the bracket on the left is a 90° quarter turn.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

Figure 1:
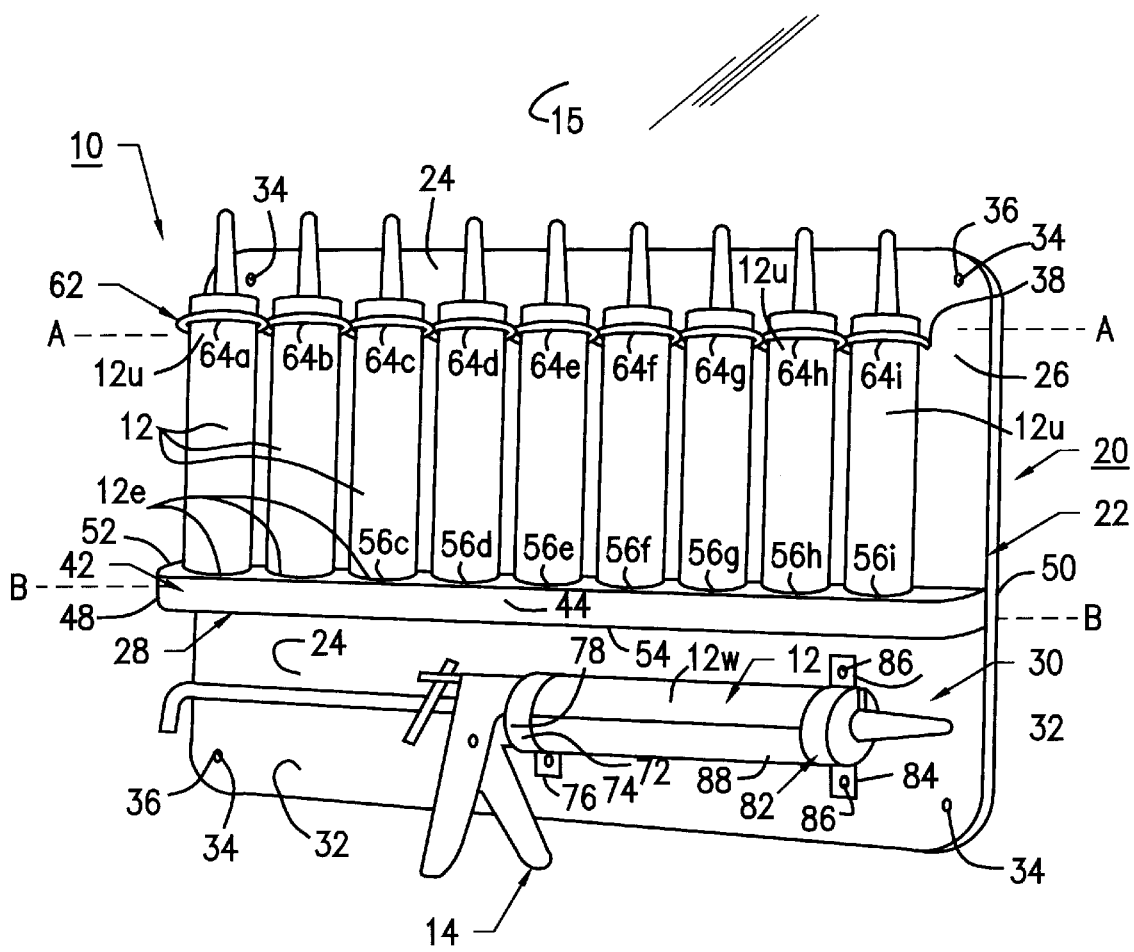
FIG. 1 is a front perspective view of the holding device of the preferred embodiment of the present invention showing the holding device and its component parts thereon in an assembled state and in operational use thereof.
Figure 4:
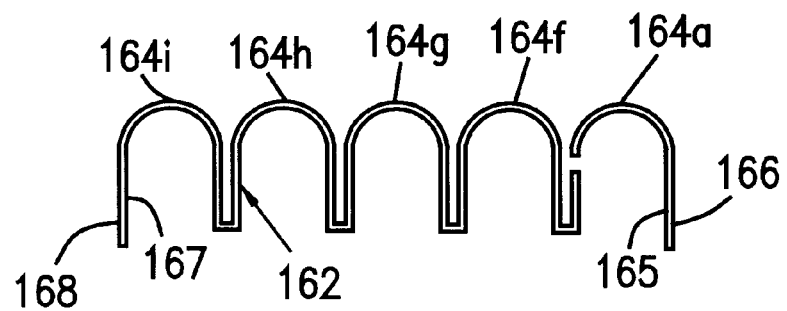
FIG. 4 is a side elevational view of the holding device of the present invention showing the major component parts thereon in an assembled state and in operational use.
Figure 5:
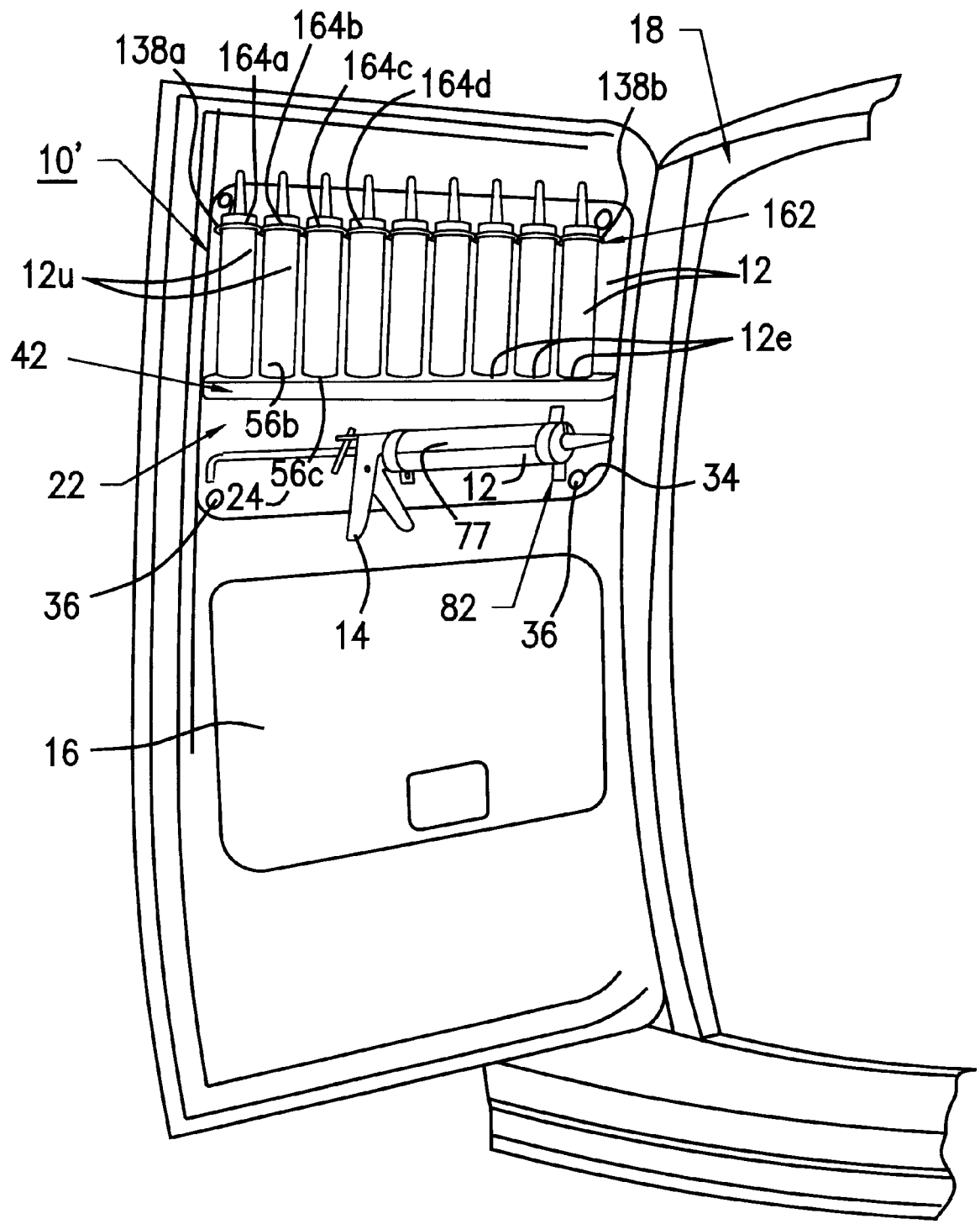
FIG. 5 is a perspective view of the holding device of the present invention showing the holding device and its component parts in an assembled state and in operational use on the back door of a van.

The holding device 10 and 10', and its component parts of the preferred embodiment of the present invention are represented in detail by FIGS. 1 through 5 of the patent drawings. The holding device 10 or 10' is used for mounting and holding a plurality of caulking canisters 12 and a caulking gun 14 thereon, as depicted in FIGS. 1 and 5 of the patent drawings. The holding device 10 includes a substantially rectangular housing 20 configuration having a back board 22, a shelf member 42, a support ring member assembly 62 and a pair of curved-shaped mounting brackets 72 and 82.

Figure 2:
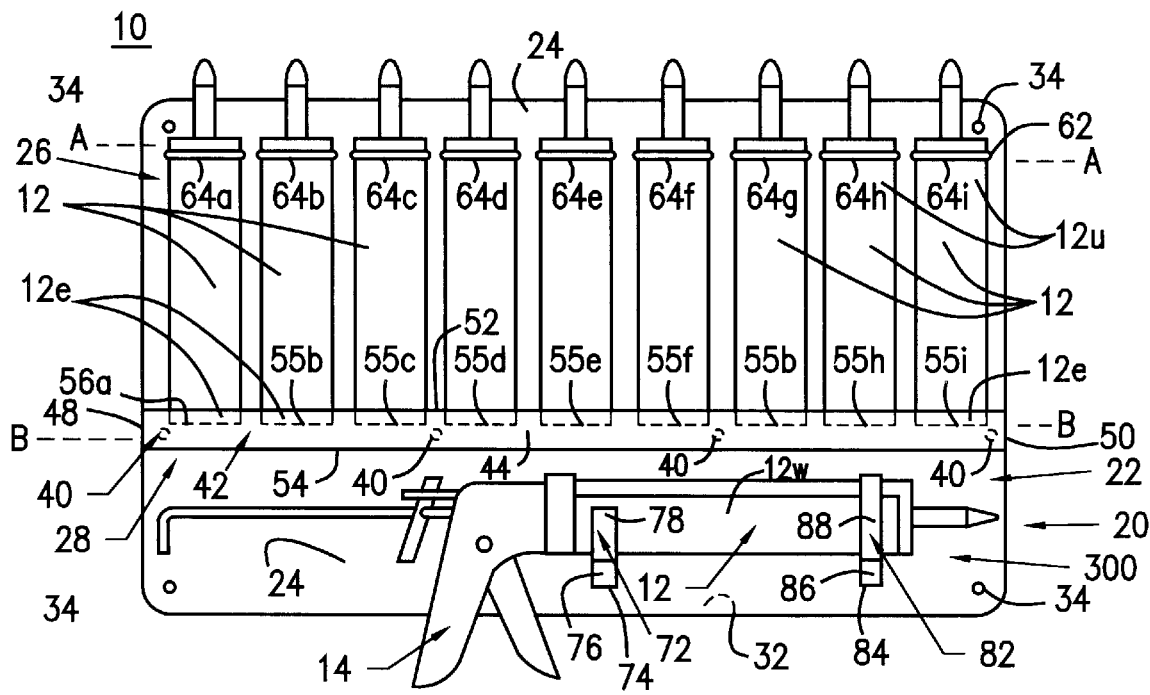
FIG. 2 is a front elevational view of the holding device of the present invention showing the back board, the shelf member, the support ring member assembly, the caulking canisters and a caulking gun being in an assembled state and in operational use.

Back board 22 being substantially rectangular in shape includes, as shown in FIGS. 1 and 2 of the drawings, a front wall surface 24 having an upper section 26, a center section 28, and a lower section 30, a rear wall surface 32, and a plurality of mounting openings 34 for receiving mounting screws 36 therein. Front wall surface 24 includes a plurality of recessed circular openings 38 for receiving the first and second ring ends 66a and 66b therein of each support ring 64a to 64i. Recessed circular openings 38 are located in the upper section 26 of the front wall surface 24 of back board 22 along a horizontal axis plane A—A, as shown in FIGS. 1 and 2 of the drawings. Rear wall surface 32 includes a plurality of circular mounting openings 40 for receiving mounting screws 36 or threaded bolts for attaching and connecting the shelf member 42 to the front wall surface 24 of back board 22. Mounting openings 40 are located in the center section 28 of the front and rear wall surfaces 24 and 32 of back board 22 along a horizontal axis plane B—B, as shown in FIGS. 1 and 2 of the drawings.

Shelf member 42 includes, as shown in FIGS. 1 to 4 of the drawings, a front surface 44, a rear surface 46, side surfaces 48 and 50, a top surface 52 and a bottom surface 54. Top surface 52 includes a plurality of recessed seat cavities 56a to 56i for receiving the bottom ends 12e of the caulking canisters 12, as depicted in FIGS. 1, 2 and 5 of the drawings. Shelf member 42 is attached to the center section 28 of back board 22, such that the rear surface 46 of shelf member is adjacent and in alignment along axis plane B—B of mounting openings 40 of back board 22. Mounting screws 36 connect the rear surface 46 of shelf member 42 to that of the front wall surface 24 of back board 22 via (through) mounting openings 40 along the horizontal axis plane B—B, as depicted in FIG. 4 of the drawings. Shelf member 42 is made from wood, light-weight rigid plastics or light-weight metals, such as aluminum.

The support ring member assembly 62 includes a plurality of individual support rings 64a to 64i. Each support ring 64a to 64i includes first and second connecting ring ends 66a and 66b for connecting and attaching within the circular recessed openings 38, as depicted in FIGS. 1, 2, 3 and 4 of the drawings. Each of the support rings 64a to 64i hold in place the upper end 12u of the caulking canisters 12 being stored within the holding device 10, as shown in FIG. 1. The support ring member assembly 62 is located along the horizontal axis plane A—A, as shown in FIGS. 1 and 2 of the drawings, of the upper section 26 of back board 22. The plurality of the support rings 64a to 64i are in alignment with the plurality of recessed seat cavities 56a to 56i, such that the plurality of caulking canisters 12 are in vertically aligned positions, as shown in FIGS. 1 and 2 of the drawings. The individual support rings 64a and 64i are made from a pre-molded rigid plastic strand, or from a pre-molded or stamped wire strand.

Figure 3:
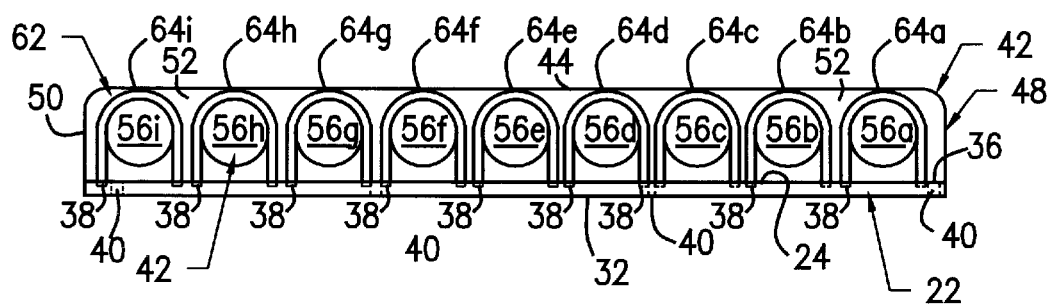
FIG. 3 is a top plan view of the holding device of the present invention showing the back board, the shelf member and the support ring member assembly having a plurality of individual support rings connected to the back board.
Figure 3A:
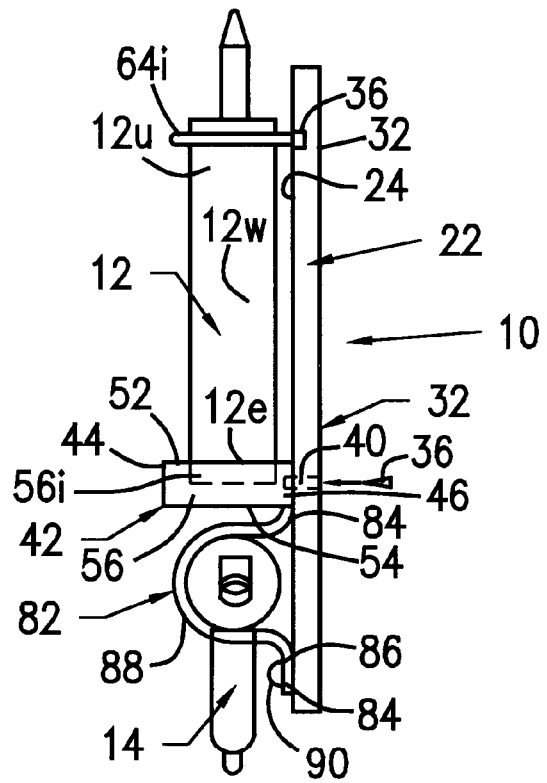
FIG. 3A is a top plan view of the support ring member assembly of an alternate embodiment made from a continuous premolded plastic strand or wire for attachment to the back board of the holding device.

Holding device 10' includes an alternate support ring member assembly 162, as shown in FIGS. 3A and 5 of the patent drawings, being made from a continuous pre-molded rigid plastic strand or a pre-molded/stamped wire strand. The support ring member assembly 162 includes a plurality of integrally connected support rings 164a to 164i having at one end 165 a first attachment end 166 and having at the other end 167 a second attachment end 168. Attachment ends 166 and 168 connect the support ring member assembly 162 via circular recessed openings 138a and 138b located in the upper section 26 of back board 22, as shown in FIG. 5 of the drawings.

The pair of curved-shaped mounting brackets 72 and 82 are used for receiving and mounting the caulking gun 14 thereon. Each of the mounting brackets 72 and 82 includes a mounting section 74 and 84 having a mounting opening 76 and 86 for receiving a mounting screw 90 therein, respectively. Bracket 72 forms 90° of a circle and bracket 82 forms 180° of a circle, both for supporting gun 14. Each of the mounting brackets 72 and 82 further include a holding section 78 and 88, respectively, for holding in place the cylindrical outer wall 12w of the caulking canister 12 that was being held within the caulking gun 14, as shown in FIGS. 1, 2 and 5 of the patent drawings. Mounting brackets 72 and 82 are made from rigid, durable plastics or light-weight formable metals such as stainless steel, aluminum and the like.

The physical dimensions of the holding device 10 or 10' is as follows: The backboard 22 measurements are 22½ inches in width and 16¼ inches in height with a wall thickness in the range of ¼ of an inch to ⅜ of an inch (¼" to ⅜") depending upon the material of construction used. The shelf member 42 measurements are 22½ inches in width and 2½ inches in depth with a shelf thickness in the range of ½ inch to 1 inch depending upon the material of construction used. Each of the recessed seat cavities 56a to 56i has a diameter of 2 inches and recessed depth in the range of ¼ inch to ⅜ of an inch depending upon the materials used. The support ring strand or wire diameter is in the range of ⅛ of an inch to 3/16 of an inch depending upon the materials used.

OPERATION OF THE INVENTION

In operating the holding device 10 or 10', the user simply installs the holding device 10 or 10' on a vertical surface wall 15, as shown in FIG. 1, via mounting screws 36 through mounting openings 34. The holding device 10 or 10' can be mounted on any type of vertical surface wall 15, such as in a garage, a basement, or home work shop and the like, as well as on the back door 16 of a van 18 or truck for the user's convenience.

The user inserts each of the canisters 12 within each of the corresponding, aligned support rings and recessed seat cavities 64a and 56a, 64b and 56b, 64c and 56c, 64d and 56d, 64e and 56e, 64f and 56f, 64g and 56g, 64h and 56h, and 64i and 56i, respectively, as shown in FIGS. 1, 2 and 5 of the drawings.

Next, the user attaches a caulking canister 12 to the caulking gun 14 and rests the caulking gun 14 on the mounting brackets 72 and 82, respectively, as shown in FIGS. 1, 2 and 5 of the drawings, such that the outer cylindrical wall 12w of caulking canister 12 is mounted and held in place by the holding sections 78 and 88 of mounting brackets 72 and 82, respectively.

In using holding device 10 or 10' in this manner the homeowner or tradesmen has been provided with an organized and neat presentation of his/her work tools and supplies in which all these items are readily seen and available for use.

ADVANTAGES OF THE PRESENT INVENTION

Accordingly, an advantage of the present invention is that it provides for a holding device for mounting and holding multiple caulking canisters and a caulking gun on a support shelf and mounting rack, respectively.

Another advantage of the present invention is that it provides for a holding device that includes a shelf member having a plurality of recessed seat cavities for receiving the bottom ends of the caulking canisters.

Another advantage of the present invention is that it provides for a holding device that includes a plurality of support rings in alignment with the plurality of recessed seat cavities for receiving the upper ends of the caulking canisters.

Another advantage of the present invention is that it provides for a holding device that includes a pair of mounting brackets for receiving and mounting a caulking gun thereon.

Another advantage of the present invention is that it provides for a holding device that can be attached to a vertical surface in a work shop, a home basement, a garage, or on a back door of a van or a commercial truck.

Another advantage of the present invention is that it provides for a holding device that is durable, non-breakable, light-weight and easy to install.

A further advantage of the present invention is that it provides for a holding device that can be mass produced in an automated and economical manner and is readily affordable by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A holding device for mounting and holding a plurality of caulking canisters and a caulking gun thereon, comprising:

a) a back board for vertical mounting having a plurality of holes for mounting said back board to a vertical surface, said back board having an upper section, a center section and a lower section;

b) a shelf having a plurality of recessed seats for receiving the bottom ends of the caulking canisters, said shelf being connected to the center section of said back board;

c) a plurality of support rings in alignment with said plurality of recessed seats for receiving the upper end of the caulking canisters, said plurality of support rings being connected to the upper section of said back board; and d) two mounting brackets for receiving and mounting a caulking gun thereon, said two mounting brackets being connected to the lower section of said back board.

2. A holding device in accordance with claim 1, wherein said back board is made from wood, light-weight rigid plastics, or light-weight metals such as aluminum.

3. A holding device in accordance with claim 1, wherein said back board has measurements of at least 20 inches in width, at least 16 inches in height and a wall thickness in the range of ¼ to ⅜ of an inch.

4. A holding device in accordance with claim 1, wherein said shelf is made from wood, light-weight rigid plastics, or light-weight metals such as aluminum.

5. A holding device in accordance with claim 1, wherein said shelf has measurements of at least 20 inches in width, at least 2 inches in depth and a shelf thickness in the range of ½ to 1 inch.

6. A holding device in accordance with claim 1, wherein each of said recessed seats has a measurement of 2 inches in diameter and a recessed depth in the range of ⅛ to 3/16 of an inch.

7. A holding device in accordance with claim 1, wherein said plurality of recessed seats include nine adjacent, aligned and evenly-spaced apart recessed seats.

8. A holding device in accordance with claim 1, wherein each of said plurality of support rings are made from a pre-molded rigid plastic strand, or from a pre-molded or stamped wire strand.

9. A holding device in accordance with claim 1, wherein said plurality of support rings are made from a continuous pre-molded rigid plastic strand or from a pre-molded or stamped wire strand.

10. A holding device in accordance with claim 1, wherein said plurality of support rings has a strand or wire diameter in the range of ⅛ to 3/16 of an inch.

11. A holding device in accordance with claim 1, wherein said mounting brackets are made from rigid, durable plastics or from light-weight formable metals such as stainless steel, aluminum and the like.

\* \* \* \* \*